United States Patent [19]
Schaefer

[11] 3,842,298
[45] Oct. 15, 1974

[54] SUBMERSIBLE ELECTRIC MOTOR
[75] Inventor: Edward J. Schaefer, Bluffton, Ind.
[73] Assignee: Franklin Electric Co., Inc., Bluffton, Ind.
[22] Filed: Apr. 6, 1973
[21] Appl. No.: 348,766

[52] U.S. Cl............................ 310/87, 310/71, 103/87
[51] Int. Cl. ................................................ H02k 5/12
[58] Field of Search ......... 310/87, 68 C, 71; 103/87

[56] References Cited
UNITED STATES PATENTS
| | | | |
|---|---|---|---|
| 2,883,566 | 4/1959 | Briggs | 310/87 |
| 3,255,367 | 6/1966 | Schaefer | 310/87 |
| 3,555,319 | 1/1971 | Schaefer | 310/87 |
| 3,604,964 | 9/1971 | Conrad et al. | 310/87 X |

Primary Examiner—Mark O. Budd
Attorney, Agent, or Firm—Hibben, Noyes & Bicknell

[57] ABSTRACT

This disclosure pertains to a submersible electric motor having an end bell member at one end and which is suspended from the end of a pipe. The end bell member serves the multiple functions of: closing the end of the motor, suspending the motor from a pipe, supporting a bearing of the motor, connecting liquid passages in the motor to the pipe, and supporting an electricl connection between the windings of the motor and a power cable contained within the pipe. The end bell member may readily be disconnected from the pipe for replacement of the motor while keeping the remainder of the motor intact. Such disassembly automatically breaks the liquid and electrical connections between the respective parts. Further, the end bell member may be disconnected from the remainder of the motor for servicing the motor.

16 Claims, 8 Drawing Figures

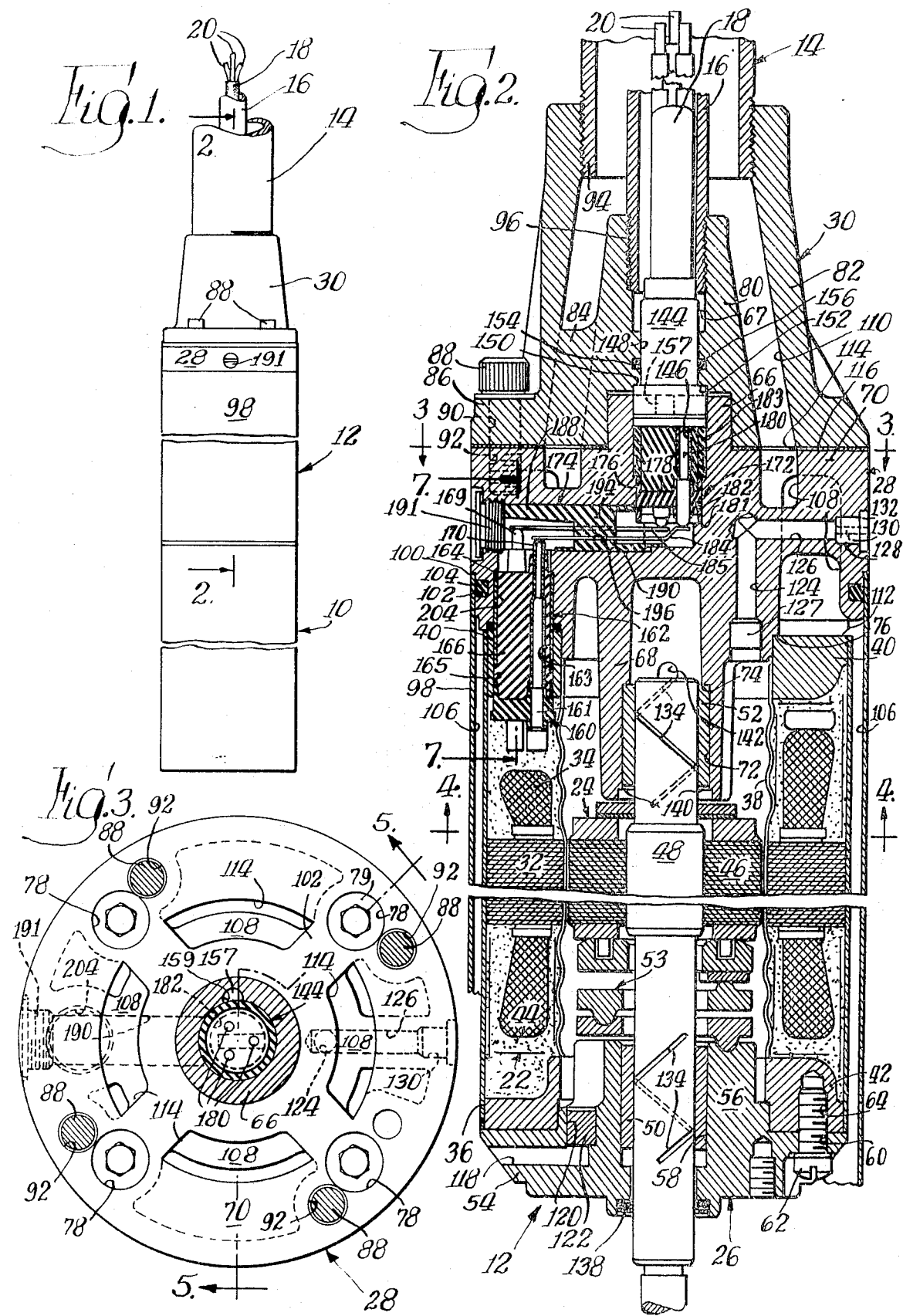

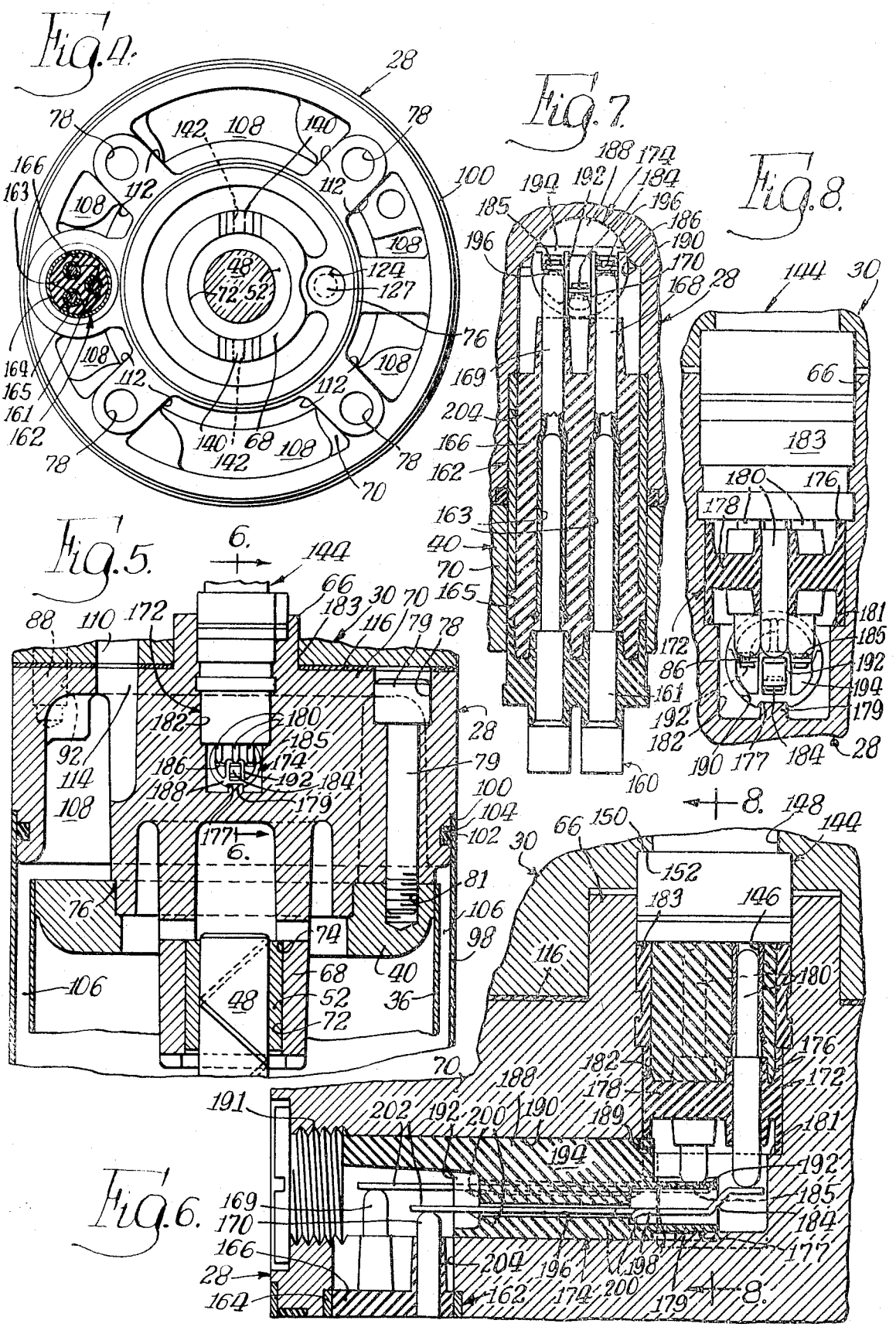

SUBMERSIBLE ELECTRIC MOTOR

A submersible motor of the character disclosed herein is suitable for use, for example, in a gasoline dispensing system. In such a system, gasoline is stored in an underground tank, and a submersible pump-motor assembly is submerged in the gasoline for pumping the gasoline out of the tank to dispensers as needed. The pump-motor assembly is usually suspended from the motor end of a pipe through which the gasoline flows to the dispensers.

A system including a motor as described above, is shown in my U.S. Pat. No. 3,555,319. The motor includes a stator having an end ring, an end bell closing one end of the motor, and a separate member for supporting a rotor bearing of the motor. The end bell is adapted to be fastened to the lower end of a pipe. The end bell has passages formed therethrough for the liquid being pumped, and in one form, an electrical cable extends through the pipe, axially and downwardly into the end bell and then radially to one side thereof to a two part connector, one part being in the end bell and the other part being in the end ring of the motor. Other wires connect the part of the connector in the end ring to the motor windings.

U.S. Pat. No. Re.26,133 also discloses a motor for use in such a system. The motor in this patent includes a bearing support member and an end shield over the bearing support member. A connector body attaches the motor to a pipe.

The structure shown in U.S. Pat. No. Re26,133 has the disadvantage that it requires a large number of cast parts and consequently is relatively expensive to manufacture and difficult to assemble. The motor shown in U.S. Pat. No. 3,555,319, requires fewer cast parts, but has the disadvantage that the motor interior must be exposed when the motor is removed for servicing or replacement. Further, it is relatively difficult to thread the electrical wires through the end member shown in this patent.

It is therefore an object of the present invention to provide an improved motor of the foregoing general character, which has relatively few cast parts at the upper end thereof but wherein the motor is maintained intact even through removed from an installation, and wherein improved electrical connections leading to the motor windings are provided.

These advantages are attained, in accordance with this invention, by providing an electric motor adapted to be suspended from the lower end of a liquid carrying pipe, and an electric power cable for the motor extending generally centrally of the pipe, the motor including an improved top or end bell member comprising a generally transversely extending wall portion, means on the upper end of said wall portion adapted to be connected to the end of the pipe, said wall portion further being adapted to be secured to the stator of said motor, bearing support means formed on the underside of said wall portion for supporting a bearing of the motor, first electrical connector means fastened to the upper side of said wall portion and forming a detachable electrical connection with said cable, and said wall portion having ports or passages therethrough permitting pumped liquid to flow upwardly from passages in the motor to the interior of said pipe.

The top member further includes a part of second electrical connector means fastened to the underside of said wall portion and forming a detachable electrical connection with a connector part on the motor, said part of said second connector means having generally radially extending electrical contacts mounted in said top member and forming an electrical connection between said first and second electrical connector means.

Other objects and advantages of the present invention will become apparent from the following detailed description taken in conjunction with the accompanying figures of the drawings, wherein:

FIG. 1 is an elevational view of a pump-motor assembly including apparatus embodying the present invention;

FIG. 2 is a fragmentary enlarged sectional view taken along the line 2—2 of FIG. 1;

FIG. 3 is a cross-sectional view taken along the line 3—3 of FIG. 2;

FIG. 4 is a view of a portion of the motor taken generally in the direction of the line 4—4 of FIG. 2;

FIG. 5 is a view taken along the line 5—5 of FIG. 3;

FIG. 6 is an enlarged fragmentary sectional view taken along the line 6—6 of FIG. 5;

FIG. 7 is an enlarged fragmentary sectional view taken along the line 7—7 of FIG. 2; and FIG. 8 is a fragmentary view taken along the line 8—8 of FIG. 6.

The assembly shown in FIG. 1 includes a pump 10, an electric motor 12 secured to the upper end of the pump 10 and connected to drive the pump, a discharge pipe 14 secured to the upper end of the motor 12, and an electric conduit 16 mounted within the pipe 14. When the assembly shown in FIG. 1 is used as part of a gasoline dispensing system, the pump-motor assembly is suspended from the lower end of the pipe 14 and is submerged in gasoline in an underground storage tank (not shown). The motor 12 is connected to a power cable 18 having three wires 20 which extend from a power supply (not shown) through the electrical conduit 16. When the motor 12 is energized and drives the pump 10, gasoline is pumped upwardly through passages, hereinafter described, formed in the motor 12, to the pipe 14 which conveys it to a header (not shown) and to the gasoline dispensers (not shown).

With reference to FIG. 2, the electric motor 12 includes a stator 22, a rotor 24, a lower end bell member 26, and an upper end bell member 28 which is adapted to be secured to an adaptor 30 on the end of the pipe 14.

The stator 22 includes a stator core 32 and stator windings 34 which are enclosed in a fluid tight, annular enclosure formed by a cylindrical shell 36, a cylindrical liner 38 positioned coaxially within the shell 36, an upper end ring 40 and a lower end ring 42. The two end rings 40 and 42 are positioned between the shell 36 and the liner 38 and are secured thereto as by welding. The stator enclosure is preferably filled with an epoxy potting compound, indicated at 44, which completely fills the space around the stator core 32 and windings 34.

The rotor 24 is mounted coaxially within a rotor cavity within the liner 38. The rotor 24 comprises a rotor core 46 mounted on a rotor shaft 48 and conventional rotor windings (not shown). The rotor shaft 48 is rotatably supported by sleeve bearings 50 and 52 and a thrust bearing assembly 53.

The lower end bell member 26 comprises a transverse wall portion 54 which extends across the bottom of the motor, and an upwardly extending cylindrical portion 56 having a bore 58 therein receiving the lower sleeve bearing 50. The transverse wall 54 of lower end bell member 26 has a plurality of openings 60 for screws 62 which are threaded into openings 64 provided in the lower end ring member 42, to secure the end ring 42 and lower end bell 26 together.

The upper end bell member 28 comprises upper and lower cylindrical portions 66 and 68 which are integral at the lower and upper ends, respectively, with a transverse wall portion 70 extending across the top of the motor. Instead of providing a separate bearing support member for the upper rotor bearing 52, as was heretofore done, the upper end bell member 28 supports the rotor bearing 52. To this end, the lower cylindrical portion 68 extends axially downwardly from the transverse wall portion 70 and has a bore 72 at the bottom which receives the upper rotor bearing 52. The bearing 52 abuts a shoulder 74 formed in the upper end of the bore 72 and is held in plaCe as by a press fit.

The upper end bell member 28 is fastened to the upper end ring 40 of the stator 22. A shoulder 76 on the bottom of the transverse wall portion 70 engages the top of the end ring 40 to properly locate the end bell member 28 for holding the bearing 52 in proper alignment. Counter-bored holes 78 (FIG. 3) are provided in the upper surface of the end bell member 28 to receive screws 79 (one being shown in FIGS. 3 and 5) which engage threaded holes 81 in the end ring 40 to removably secure the end bell member to the end ring.

The adaptor 30 includes inner and outer coaxial wall portions 80 and 82 which are connected by a radially extending rib 84. At the lower end of the outer wall portion 82 is a radially extending flange 86 which is seated on the upper surface of the end bell 28. The flange 86 is removably secured to the upper end bell 28 by screws 88. The screws 88 are positioned in holes 90 in the flange 86 of the adaptor 30 and engage threaded holes 92 in the upper end bell member 28, thus removably securing the adaptor to the end bell member.

The adaptor 30, in turn, is secured to the pipe 14 and to the conduit 16. To this end, the upper end of the outer wall 82 of the adaptor 30 engages a threaded end 94 of the pipe, and the upper end of the inner wall 80 of the adaptor 30 engages a threaded end 96 of the conduit 16. Thus the motor 12 including the upper end bell member 28 is suspended from the adaptor 30 and the pipe 14.

Around the stator 22 is a casing 98 which extends from the discharge of the pump 10 upwardly to the end bell member 28. The upper end of the casing 98 abuts a circumferential shoulder 100 formed on the lower end of the wall portion 70 of the upper end bell member 28. A groove 102 containing an O-ring 104 is provided just below the shoulder 100 to seal the connection between casing 98 and the end bell member.

The liquid being pumped flows from the discharge of the pump and through a passage 106 between the shell 36 and the casing 98. From the passage 106, the liquid flows through a passage 108 (FIG. 2) in the upper end bell member 28 of the motor and through a passage 110 in the adaptor 30 to the pipe 14.

The passage 108 in the upper end bell member 28 has an entrance indicated at 112 (FIGS. 2 and 5) and extends upwardly. An exit 114 is provided at the upper surface of the end bell member 28. The liquid then flows from the passage 108 to the adaptor 30, and the connection between the adaptor 30 and the upper end bell member 28 is sealed by a gasket 116.

A small portion of the liquid delivered from the pump 10 is circulated through the rotor cavity for cooling the motor 12 and also for lubricating the sleeve bearings 50 and 52. Passages 118 and 120 are formed in the lower end bell member 26 and a filter 122 in one of the passages prevents entry of foreign material into the motor and acts as a flame barrier. The passage 120 opens into the rotor cavity. From the upper end of the rotor cavity the liquid flows through passages 124 and 126 formed in the upper end bell member 28. Another filter-flame barrier 127 is provided in the passage 124. A bushing 128 is provided in the outer end of the passage 126 to restrict the flow of liquid through the rotor cavity. The bushing 128 has an orifice 130 in its interior. Thus, liquid can flow through the passages 118 and 120 through the rotor cavity through the passages 124 and 126, through the orifice 130 and back to the tank.

For lubrication of the bearings 50 and 52, spiral grooves 134 are provided in the ends of the shaft 48 to pump liquid through the bearings. The spiral groove 134 in the lower end of the shaft 48 draws liquid from the rotor cavity and pumps it downwardly through the bearing 50 to be discharged through a felt filtering washer 138 and then to the exterior of the motor. The washer 138 filters the liquid should the flow be reversed to prevent contaminants from entering the rotor cavity. Similarly, groove 134 in the upper end of the shaft 48 pumps liquid upwardly through the upper bearing 52 for lubrication. Liquid is drawn from the rotor cavity and flows through slots 140 (FIGS. 2 and 4) provided in the bottom end of the lower cylindrical wall portion 68 of the end bell member 28. The liquid is pumped by the groove 134 in the shaft 48 through the bearing 52, and then discharged to the upper end of the bore 72. From there, the liquid flows through openings 142 provided in the lower cylindrical wall portion 68, the openings 142 discharging back into the rotor cavity. The openings 142 also prevent air or vapors from being trapped in the bearing 52 so that the bearing does not run without benefit of liquid lubrication.

Electrical connections are also provided to connect the cable 18 to the stator windings 34. As is shown in FIG. 2, the cable 18 terminates in a connector part 144 having female socket portions 146, one for each of the three wires 20 in the cable 18. The connector part 144 is fastened within a counterbored opening 148 provided in the lower part of the adaptor 30, a shoulder 150 on the connector part 144 engaging a shoulder 152 on the adaptor 30 to locate the connector part 144 in the adaptor. A groove 154 containing an O-ring 156 is provided in the adaptor 30 to seal the connection between the connector part 144 and the adaptor. The female socket portions 146 of the connector part 144 are surrounded by insulating material and open downwardly toward the upper end bell member 28. The connector part 144 has a radial projection 157 which fits in a slot in the adaptor and in a similar slot 159 (FIG. 3) in the end bell 28 to align the parts of the connector.

Wires 160 run from the stator winding 34 to a male plug 161 which fits into female sockets 163 of a connector part 162 located in a bore 165 in the end ring 40. The connector part 162 in the end ring 40 includes a metal sleeve 164, and an insulating, rubber like material, indicated at 166 fills the interior of the metal sleeve 164. The sockets 163 extend upwardly from the insulating material forming three prongs 168, 169 and 170, the prong 170 being shorter than the other two (FIGS. 2, 6 and 7). The three prongs 168–170 are adapted to engage electrical connecting means mounted in the end bell member 28.

The above-mentioned electrical connecting means of the end bell member 28 comprises a connector part 172 (FIG. 6) connected to the connector part 144 in the adaptor 30 and a contact arm assembly 174 which is transversely mounted in the end bell member and which engages the connector part 162 of the stator 22. The connector part 172 in the upper end bell member 28 comprises a cylindrical body 176 made of an insulating material and having a transverse wall 178 in which are mounted three prongs 180 (FIGS. 6 and 8). The prongs 180 extend above and below the transverse wall 178 of the connector part 172. The connector part 172 is contained within a bore 182 which in this instance is centrically located in the end bell member 28 and connects with the connector part 144 in the adaptor 30. The prongs 180 fit in the female sockets 146 of the connector 144. A sleeve 183 is provided in an enlarged portion of the bore 182 to hold the body 176 in place against a ledge 181 after it is properly aligned as described below.

The contact arm assembly 174 comprises three contact arms 184, 185 and 186 (FIGS. 2, 6, 7 and 8) which are mounted in a housing 188 made of an insulating material. The housing 188 on its lower side, at its inner end, has a groove 177 (FIG. 8) which engages a rib 179 provided on the bottom of the bore 182 to hold the housing 188 against rotating. The housing 188 and the body 176 are held in alignment by a slot located in the body which receives a projection 189 on the housing 188. The contact arm assembly 174 is contained in a transverse bore 190 formed in the end bell member 28, which extends radially outward from the bore 182. The outer end of the bore 190 is closed by a threaded plug 191. The housing 188 is divided into three separate compartments, one for each of the contact arms, by interior partitioning 192 (FIG. 8). As is best shown in FIGS. 6 and 8, the housing has a transverse wall 194, in which three openings 196 are provided, one for each of the contact arms. Each contact arm comprises a generally flat, elongated, resilient strip 198 having two oppositely directed barbs 200. The barbs 200 provide a means to locate the strip 198 in the contact housing 188 and to hold it lengthwise in place. As a strip 198 is inserted into one of the openings 196, one of the barbs 200 is deflected to permit the strip 198 to pass therethrough. When the other barb 200 engages the wall 194, the deflected barb 200 then springs back to its original position to retain the strip 198 in place.

The lower ends of the prongs 180 of the connector part 172 in the upper end bell member 28 extend equal distances downwardly into the bore 182. The contact arms 184–186, as is shown in FIG. 8, are arranged in a triangle with the center arm 184 being below the other two. As is shown in FIG. 6, the right or inner end of the lower contact arm 184 is bent upwardly so as to be substantially at the same height as the other two arms. The contact arms 184–186 engage the lower ends of the prongs 180. The left or outer ends 202 of the contact arms 184–186 are generally straight and are also arranged in a triangle as is shown in FIG. 7. The left ends 202 of the arms 184–186 extend above a bore 204 in the end bell 28, which receives the prongs 168–170 of the connector part 162 on the stator 22. The prongs 168–170 mounted on the stator 22 are of unequal length, with the prong 170 which contacts the lower contact arm 184 being shorter than the other two prongs. Thus, electrical energy can be supplied through the cable 18 to the connector part 144 in the adaptor 30, to the connector part 172 in the upper end bell member 28, through the contact arm assembly 174 in the upper end bell member, to the connector part 162 on the stator 22 and to the stator windings 34 to power the motor 12.

In a pump-motor assembly including an upper end bell member 28 embodying the present invention, the upper end bell member 28 may be attached at the factory to the end ring 40 by the screws 79.

In the field, the adaptor 30 is attached to both the pipe 14 and the conduit 16, and the connector part 144 connected to the cable 14 is installed in the adaptor 30. Then the adaptor 30 and the end bell member 28 including the remainder of the motor 12 are moved into assembled relation. The end bell member 28 and the adaptor 30 are angularly adjusted to bring the two electrical connector parts 144 and 172 into alignment, and when such alignment is attained, the end bell member 28 and the adaptor 30 are moved together to seat the flange 86 on the end bell member. Such movement of course automatically makes an electrical connection between the electrical connector parts 144 and 172 and also automatically makes a liquid connection between the passages 108 and 110 in the end bell member 28 and the adaptor 30, respectively. The screws 88 are then tightened to firmly but removably secure the adaptor 30 and the end bell member 28 together. Thereafter, the pump-motor assembly, suspended from the lower end of the pipe 14, may be lowered into the liquid to be pumped from the storage tank.

In the event it is necessary to replace or service the electric motor 12 or the pump 10, the pipe 14 and the conduit 16 are pulled upwardly to raise the pump-motor assembly out of the storage tank. The screws 88 are then removed, permitting the adaptor 30 to be disconnected from the upper end bell member 28 and the remainder of the motor 12. With such a disconnection, the liquid connection and the electrical connection between the adaptor and end bell member are automatically broken without opening up the interior of the motor. The pump motor assembly may then be replaced.

If necessary, the motor 12 may be further disassembled for servicing by removing the end bell member 28 from the end ring 40. Such disassembly also automatically breaks the electrical connection between the stator 22 and the end bell member. In either event, an operative pump motor assembly having an end bell member 28 is subsequently re-attached to the adaptor 30 in the manner previously described, and the assembly is then again lowered into the tank.

It is apparent from the foregoing description that a novel and useful end bell member for a submersible electric motor has been provided. The end bell performs multiple functions of: closing an end of the motor, suspending the motor from a pipe, supporting a bearing of the motor, connecting liquid passages in the motor to a pipe and supporting an electrical connection to connect a power cable in the pipe to the motor windings. The electrical connection, comprising a generally axial connector part which is adapted to connect with a connector part on the cable and a generally radial contact arm assembly in the end bell member which is adapted to connect with a connector part on the stator of the motor, permits the end bell to be of short height and permits the motor to be replaced without exposing the interior thereof.

The end bell member is also advantageous because, with the plug 191 removed, the contact arm assembly, or another type of conductor, may be assembled with one of the connector parts, after which the plug 191 is used to seal the outer end of the opening.

I claim:

1. In an electric motor adapted to be suspended from the lower end of a liquid carrying pipe with an electric power cable for the motor extending within the pipe, the improvement of an end bell member for the motor comprising a generally transversely extending wall portion, means on the upper end of said wall portion adapted to be connected to an adaptor which is secured to the pipe, said wall portion further being adapted to be secured to the stator of said motor, bearing support means formed on the underside of said wall portion for supporting a bearing of the motor, electrical connector means fastened to the upper side of said wall portion and forming a detachable electrical connection with said cable, electrical conductor means connected to said connector means and extending through said wall portion and adapted to be connected to windings of said motor stator, and said wall portion having a passage therethrough permitting pumped liquid to flow upwardly from a passage in the motor to the interior of said pipe.

2. Apparatus as in claim 1, wherein said end bell member further includes second electrical connector means at the underside of said wall portion for forming a detachable electrical connection with the motor windings, said second connector means having generally radially extending electrical conductors mounted in said end bell member and forming an electrical connection with said first mentioned electrical connector means.

3. In an electric motor adapted to be suspended from the lower end of a liquid carrying pipe with an electric power cable for the motor extending within the pipe, the improvement comprising a top member for said motor, said member including a generally cylindrical outer portion having a transversely extending wall portion, the upper end of said outer portion being adapted to be connected to an adaptor which is secured to the pipe, the lower end of said outer portion being adapted to be secured to the stator of said motor, electrical connector support means formed on the upper side of said wall portion for supporting a first electrical connector part, said connector support means being located on said wall portion, an opening formed in said wall portion adjacent the stator of the motor and radially spaced from said support means, said opening being adapted to receive a second electrical connector part, a radially extending passage formed in said wall portion between said connector support means and said opening, said passage being open at its outer end, a plurality of electrical conductors mounted in said passage for electrically connecting said first and second electrical connector parts, said conductors being assembled with at least one of said connector parts through said opening, and plug means for sealing said outer end of said passage after assembly of said conductors with said one connector part.

4. In a submersible electric motor adapted to be suspended from a pipe having an electric cable therein, said motor including a stator containing windings forming a rotor enclosure, said motor also including bearings, and a rotor rotatably mounted in said bearings, said motor having a liquid passage therein, the improvement comprising an end bell adapted to be secured to one end of said stator and to the pipe to suspend said motor, said end bell having a transverse wall closing the end of the rotor enclosure and an integral cylindrical portion depending from said transverse wall into the rotor enclosure, said cylindrical portion carrying one of the bearings for the rotor, said end bell having first and second detachable electrical connector means for automatically connecting and disconnecting the electric cable to and from the windings, said first connector means being connectable to said cable and said second connector means being connectable to said stator windings, and said end bell having liquid passage means for connecting the liquid passage in the motor to said pipe.

5. In the end bell of claim 4, wherein said first electrical connector means comprises a connector part extending from the end bell toward the pipe, said connector part being adapted to connect with a cooperating connector part in the pipe, and said second connector means comprises a contact arm assembly located in the end bell member, one end of said contact arm assembly engaging said connector part of said end bell, and the other end of said contact arm assembly being adapted to engage a connector part on the stator.

6. In the end bell of claim 5, wherein said connector part of said end bell comprises a cylindrical body having a transverse wall and a plurality of prongs extending axially above and below said transverse wall, one end of said prongs engaging said contact arm assembly, and the other end of said prongs being adapted to engage the connector part in the pipe.

7. In the end bell of claim 6, wherein said contact arm assembly comprises a housing having partitioning providing a plurality of chambers, a plurality of resilient strips, one in each chamber, one end of each of said strips contacting said prongs, and the other ends of said strips being adapted to contact the connector part on the stator.

8. In the end bell of claim 7, wherein said end bell and said housing have cooperating rib and groove structure to align said housing in said end bell.

9. In the end bell of claim 7, wherein said housing and body have cooperating projection and slot structure to align said body and housing.

10. In the end bell of claim 5, wherein said connector part of said end bell is located in an axial opening in said end bell, and said contact arm assembly is located in a transverse opening in said end bell, the inner end of said transverse opening intersecting said axial opening, a second axial opening provided in said end bell and adapted to receive the connector part on said stator, the outer end of said transverse opening intersecting said second axial opening.

11. In the end bell of claim 4, wherein said cylindrical portion has openings above and below said bearing to provide for liquid flow through said bearing.

12. In the end bell of claim 11, wherein a liquid passage is provided in said end bell member for liquid flow from the rotor cavity to the exterior of said end bell.

13. In a submersible electric motor adapted to be suspended from an adaptor on a pipe having an electric cable therein, the motor including a cylindrical stator containing stator windings and forming a rotor enclosure, said motor also including a rotor rotatably mounted in the rotor enclosure, the adaptor and motor having liquid passages therein, the improvement comprising an end bell adapted to be secured to the stator and to the adaptor to suspend the motor, said end bell having a transverse wall closing the end of the rotor enclosure, said end bell having liquid passage means for connecting the liquid passages in the motor and adaptor, and said end bell having electrical connector means for automatically connecting and disconnecting the electric cable to the stator windings by assembling and disassembling said end bell to the adaptor, said electrical connector means including a connector part located in an axial bore in the end bell and adapted to be connected to a corresponding connecting part on the adaptor, to contact arm assembly located in a radial bore in the end bell, said radial bore intersecting said axial bore at one end and intersecting a second axial bore in said end bell at its other end, said contact arm assembly contacting said connector part in said end bell at one end, and at the other end said contact arm assembly being adapted to contact a connector part on the stator extending into said second axial bore.

14. In an electric motor adapted to be suspended from the lower end of a liquid carrying pipe with an electric power cable for the motor extending within the pipe, the improvement comprising a top member for said motor, said member including a generally cylindrical outer portion having a transversely extending wall portion, the upper end of said outer portion being adapted to be connected to an adaptor which is secured to the pipe, the lower end of said outer portion being adapted to be secured to the stator of said motor, said member having an opening therethrough and the outer end of said opening appearing at the outside of said member, one part of an electrical connector means extending into said opening, electrical conductor means extending through said opening and assembled with said one part through said opening, and plug means for sealing the outer end of said opening after assembly of said conductors with said one part.

15. In an electric motor adapted to be suspended from the lower end of a liquid carrying pipe with an electric power cable for energizing the stator windings of the motor extending within the pipe, the improvement of an end bell member for the motor comprising a generally transversely extending wall portion, one end of said wall portion being connected to an adaptor which is secured to the pipe, said wall portion further being secured to the stator of said motor, bearing support means formed on the other side of said wall portion for supporting a rotor bearing of the motor, said wall portion having a passage therethrough permitting pumped liquid to flow upwardly from a passage in the motor to the interior of said pipe, first electrical connector means fastened to said one side of said wall portion and forming a detachable electrical connection with said cable, a passage formed in said wall portion and extending generally radially outwardly from said first electrical connector, second electrical connector means mounted in said passage adjacent the outer end thereof and connected to said stator windings, and a plurality of electrical conductors extending generally radially in said passage between said first and second connectors.

16. Apparatus according to claim 15, wherein said first electrical connector means comprises a connector part extending from the end bell member toward the pipe, said connector part being adapted to connect with a cooperating connector part in the pipe, and wherein said conductors comprise a contact arm assembly located in said passage, one end of said contact arm assembly engaging said first electrical connector means, and the other end of said contact arm assembly engaging said second electrical connector means.

* * * * *